M. GROSSMAN.
RESILIENT WHEEL.
APPLICATION FILED AUG. 27, 1917.

1,257,220.

Patented Feb. 19, 1918.
2 SHEETS—SHEET 1.

WITNESSES

INVENTOR
Martin Grossman
BY
ATTORNEYS

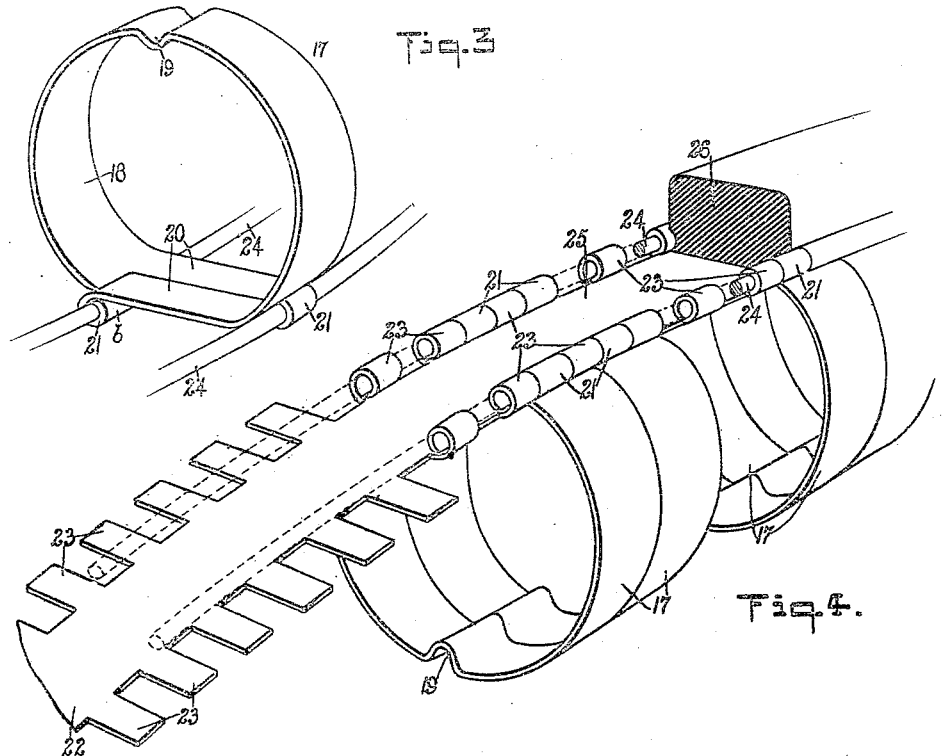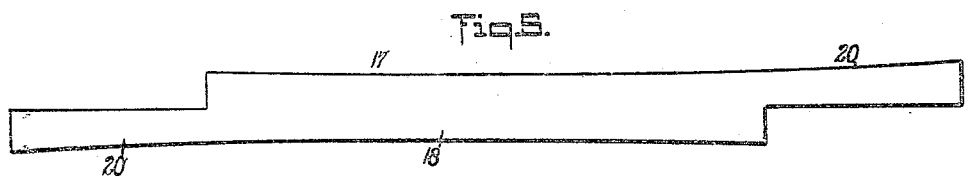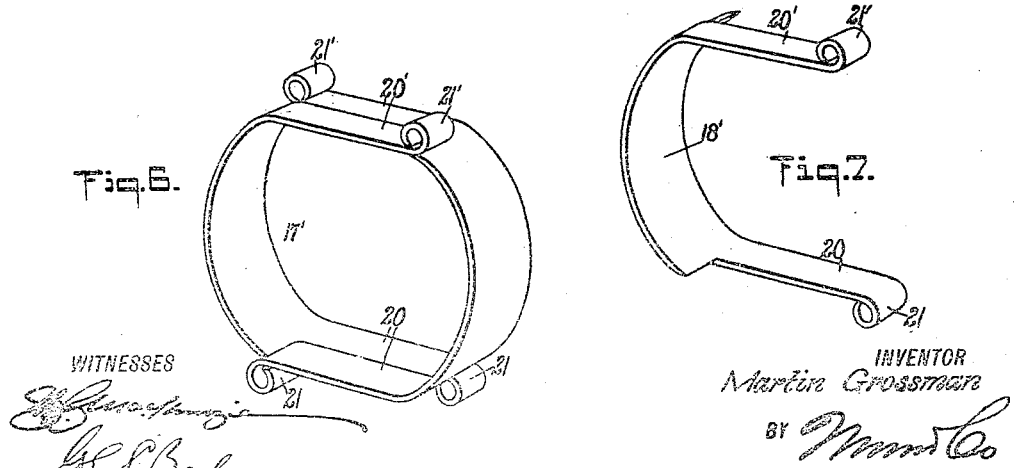

UNITED STATES PATENT OFFICE.

MARTIN GROSSMAN, OF NEW YORK, N. Y.

RESILIENT WHEEL.

1,257,220.   Specification of Letters Patent.   Patented Feb. 19, 1918.

Application filed August 27, 1917. Serial No. 188,437.

*To all whom it may concern:*

Be it known that I, MARTIN GROSSMAN, a citizen of the United States, and a resident of the city of New York, borough of the Bronx, county of Bronx, and State of New York, have invented a new and Improved Resilient Wheel, of which the following is a full, clear, and exact description.

This invention relates to resilient wheels and has particular reference to wheels having a flexible and resilient tread portion.

Among the objects of the invention is to provide a wheel having a spring rim or tread portion comprising a circumferential series of radially disposed rounded or elliptical spring elements, the entire wheel having an appearance very similar to an ordinary pneumatic tired wheel and whose action likewise compares favorably with that of a pneumatic wheel.

Another object of the invention is to provide a resilient tire or tread for a wheel, said tread including a circumferential series of rounded spring elements having knuckles at their outer portions and a band surrounding said spring elements and having other knuckles coöperating with the knuckles aforesaid with means for interlocking all of the knuckles of the same series together and providing a seat for a cushion adapted to have direct contact with the roadway.

With the foregoing and many other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Fig. 4 is a detail perspective view indicating a group of spring elements similar to that shown in Fig. 3, the same being surrounded with a locking band which supports a cushion tire, this figure indicating also the relation of the hoops to the two series of interlocking knuckles of the band and the spring elements.

Fig. 5 is a plan view of one of the spring elements such as indicated in Fig. 3, while in flat form.

Fig. 6 is a modified form of spring element the same being made in two parts and having locking knuckles both inside and outside considered radially of the wheel.

Fig. 7 is a detail perspective view of one of the parts shown in duplicate in Fig. 6; and Fig. 8 is a vertical transverse section of the modified form indicating its relation to the felly, the view being otherwise similar to that of Fig. 2.

Figure 1:
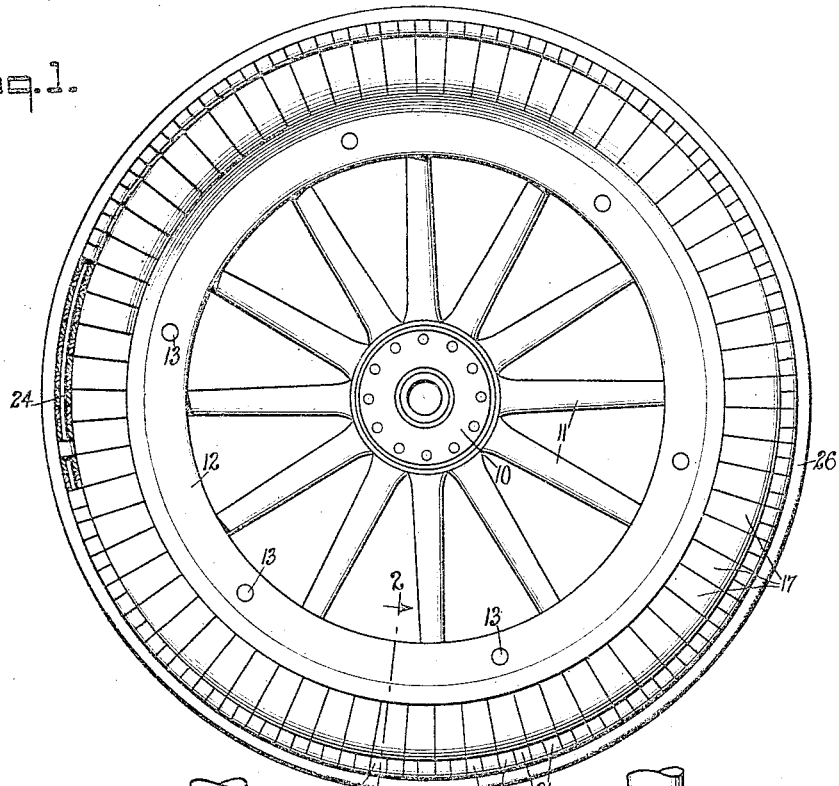
Figure 1 is a side elevation of a wheel made in accordance with this invention, certain parts being broken away to disclose one of the binding hoops.

The wheel indicated may comprise any suitable hub 10, spokes 11 and felly 12, the felly being of a rigid nature and made of any suitable material adapted for the reception of transverse bolts or similar fasteners 13 serving to secure the tire supporting flanges 14 to the felly.

Figure 2:
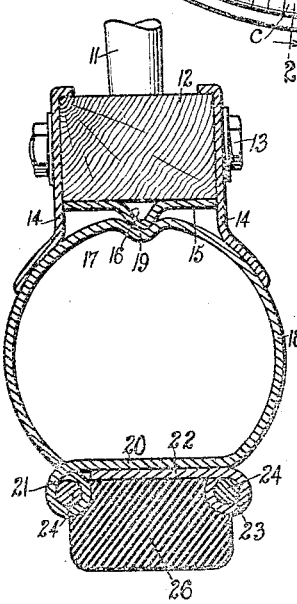
Fig. 2 is a vertical transverse sectional detail on the line 2—2 of Fig. 1.

In the form of the invention shown in Figs. 1 and 2 I provide a band 15 which surrounds and is snugly fitted upon the outer face of the felly 12 and provided with a central outwardly projecting rib 16, said rib serving to strengthen and stiffen the band and more particularly to coöperate with the spring elements to prevent lateral displacement thereof with respect to the felly. The flanges 14 snugly embrace the side edges of the band 15 and prevent the same from movement laterally from the felly, the flanges projecting thence outwardly in a rounded flare forming with the rib 16 a seat or channel for the resilient tire or tread.

Referring now more particularly to Figs.

Figure 3:
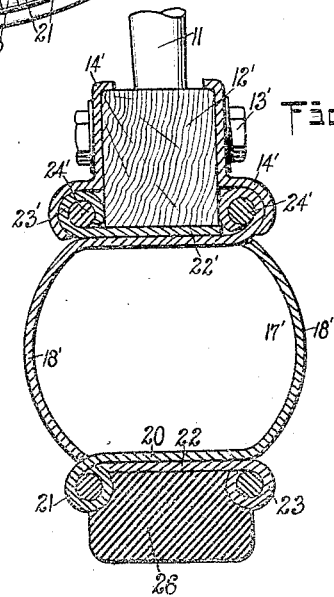
Fig. 3 is a detail perspective view indicating especially one form of spring element and its relation to the two binding hoops.

3, 4 and 5 as to the construction of the spring elements it will be noted that I provide an endless circular series of such elements indicated at 17 and all of uniform design. Each of these elements is formed from a blank as shown in Fig. 5. The blank comprises a main central portion 18, crimped at its center to form a groove 19 coöperating with the rib 16 in practice, there being formed as integral extensions of the diagonally opposite corners of the main portion 18 tongue members 20 each adapted to be rolled at its free end to form a knuckle 21. The ends of the main portion 18 are slightly wider than the central grooved portion 19 so as to dispose the two edge portions of the element 17 in planes substantially radial with respect to the wheel when the element is in its normal or operative form or position as shown in Figs. 3 and 4. In other words when the elements are assembled forming an endless circular series there is practically no gap or space between any two adjacent elements.

Another main or important part of the construction consists of a band 22 substantially flat or straight in cross section in the form indicated subject, however, to variation in this respect as may be desired and having along its side edges two series of integral lugs 23 adapted to be rolled outwardly to form knuckles similar in character to the knuckles 21. The knuckles or lugs 23 on one side are staggered with respect to those on the opposite side or edge of the band and each two adjacent lugs or knuckles 23 being spaced to receive one of the knuckles 21 so that when the parts are assembled the knuckles 21 and 23 alternate throughout the two series of such knuckles. It will be noted in this connection that the tongue members 20 of each element 17 lie alongside each other and are snugly embraced where they so lie or overlap by said band 22. See Fig. 2. A pair of binding hoops 24 are threaded through the knuckles 21 and 23 of both series of knuckles and have their ends joined as by welding or the like in any suitable manner making a strong and continuous circular seat or channel 25 for a cushion tire 26 of any desired nature such as solid rubber, the knuckle portions of the band and spring elements in this form of the invention all projecting outwardly beyond the plane of the band 22. With the device made in accordance with the description thus far given the entire structure may be mounted upon the felly 12 with facility when either of the flanges 14 is removed. The band 15 is introduced into the grooves 19 in the inner side of the spring elements and then the tire structure with the band 15 is slipped upon the felly, there being locked by reattaching the flange 14.

In that form of the invention shown in Figs. 6, 7 and 8, a band 22′ similar in construction to the above described band 22 is employed upon the outer surface of the felly 12′ taking place of the band 15. The knuckles 23′ of this substitute band 22′ are directed toward the center of the wheel or so as to lie on opposite sides of and embrace the felly. Likewise the spring elements 17′ are each composed of two duplicate parts 18′ each having a tongue 20 and knuckles 21 on the outer side and a tongue 20′ and knuckle 21′ on the inner side, the knuckles 21′ being interlocked with the knuckles 23′ of the inner band by means of hoops 24′. A tire made in accordance with this feature of the invention may be sprung upon the felly 12′ in any suitable manner and locked in such position by means of flanges 14′ held in place by fasteners 13′. A cushion 26 or its equivalent may be employed in the channel formed on the outer side of the periphery of the series of spring elements.

I claim:

1. In a vehicle wheel, the combination with a hub, a felly and connections between the hub and felly, of a tire structure surrounding the felly, said tire structure comprising a circular series of radially disposed rounded spring elements comprising tongues formed on their free ends, each tongue terminating in a knuckle, a band surrounding the circular series of spring elements, means connecting the edges of the band to the spring element knuckles forming a channel, a tread member seated in said channel, and means to lock the tire structure to the felly.

2. In a wheel of the character set forth including a felly, a band fitted upon the periphery of the felly, a circular series of spring elements of rounded form surrounding said band, means to lock said spring elements in place upon the band from lateral movement, said spring elements including overlapping tongue members terminating in rounded knuckles, the knuckles of each element being staggered on one side with respect to those on the opposite side of the central plane of the wheel, a band surrounding the tongue portions of the spring elements and having rounded knuckles formed upon its opposite edges, the latter mentioned knuckles also being staggered on opposite edges and lying between the respective knuckles of the spring elements, a pair of hoops extending through all of said knuckles and interlocking the latter mentioned band and the spring elements together, and a cushion surrounding and located between the knuckle and hoop portions of the device.

3. In a resilient wheel, the combination with a felly, of a circular series of spring elements arranged radially with respect to the wheel and each element being bounded circumferentially of the wheel by two radial planes intersecting in the axis of the wheel, each spring element having a pair of tongues terminating in a pair of circumferentially arranged laterally spaced knuckles, means coöperating with the knuckles of the spring elements serving to lock together circumferentially in two series the portions thereof remote from the axis of the wheel, and a tread member secured upon and surrounding said spring elements and located between the two series of knuckles aforesaid.

MARTIN GROSSMAN.

Copies of this patent may be obtained for five cents each, by addressing the "Commissioner of Patents, Washington, D. C."